(12) United States Patent
McCulloch et al.

(10) Patent No.: US 6,450,024 B1
(45) Date of Patent: Sep. 17, 2002

(54) FLOW SENSING DEVICE

(75) Inventors: Reginald W. McCulloch, Caryville; Omar Garcia, Oak Ridge, both of TN (US)

(73) Assignee: Delta M Corporation, Oak Ridge, TN (US)

( * ) Notice: Subject to any disclaimer, the term of this patent is extended or adjusted under 35 U.S.C. 154(b) by 0 days.

(21) Appl. No.: 09/800,884

(22) Filed: Mar. 7, 2001

(51) Int. Cl.$^7$ ............................................... G01F 1/68

(52) U.S. Cl. ............................................... 73/204.25

(58) Field of Search ................... 73/204.25, 204.15, 73/204.16, 204.18, 204.26, 204.27, 204.11, 204.19; 324/706

(56) References Cited

U.S. PATENT DOCUMENTS

| | | | |
|---|---|---|---|
| 4,599,895 A | | 7/1986 | Wiseman |
| 4,916,948 A | * | 4/1990 | Inada et al. ................ 73/202.5 |
| 4,961,348 A | * | 10/1990 | Bonne ...................... 73/861.02 |
| 4,982,605 A | | 1/1991 | Oram et al. |
| 5,137,370 A | | 8/1992 | McCulloch et al. |
| 5,216,918 A | * | 6/1993 | Landis et al. ............. 73/204.19 |
| 5,237,523 A | | 8/1993 | Bonne et al. |
| 5,419,190 A | * | 5/1995 | Boyd ....................... 73/204.25 |
| 5,522,261 A | | 6/1996 | Grover et al. |
| 5,576,487 A | | 11/1996 | Gimson |
| 5,944,048 A | | 8/1999 | Bump et al. |
| 5,975,126 A | | 11/1999 | Bump et al. |
| 6,098,457 A | | 8/2000 | Poole |

OTHER PUBLICATIONS

Summary Report on the Development of a Hot–Wire Trubulence–Sensing Element for Use in Water, 1956, R.G. Stevens, A. Borden and P.E. Straussen, Report 953, Navy Department, The David W. Taylor Model Basin.

Hot Wire and Hot Film Anemometry, 1984, Eric Nelson, Sensors Magazine.

Characteristics and Applications of Industrial Thermal Mass Flow Transmitters, Jerry Kurz, 1992, pp. 107–113, Instrumentation Society of America 47$^{th}$ Annual Symposium on Instrumentation for the Process Industries.

Hot Wire Anemometry: Principles and Signal Analysis, H.H. Bruun, Oxford University Press, 1995, pp. 112–121.

Industrial Thermal Mass Flow Meters, 1999, John G. Olin, pp. 83–90, Measurement & Contro Magazine.

* cited by examiner

*Primary Examiner*—Benjamin R. Fuller
*Assistant Examiner*—Jewel V. Thompson
(74) *Attorney, Agent, or Firm*—Luedeka, Neely & Graham, P.C.

(57) ABSTRACT

An apparatus is provided for determining the mass flow rate of a fluid using thermal means. The apparatus utilizes resistance temperature detectors having substantially linear temperature dependencies to determine the mass flow rate of a fluid. The apparatus maintains a constant ratio between resistances of the first and second resistance temperature detectors, the amount of current necessary to maintain the constant ratio corresponding to the mass flow rate of the fluid. The apparatus includes a microprocessor wherein an algorithm relating the current and mass flow rate including thermophysical properties of the fluid, sensor thermal resistance, and probe stem loss information provides the fluid mass flow rate based upon calibration information. Operation in alternate fluids without the need for recalibration is possible utilizing calibration constants obtained in the primary fluid and substitution of thermophysical properties and stem loss characteristics of each fluid in which operation is desired.

24 Claims, 5 Drawing Sheets

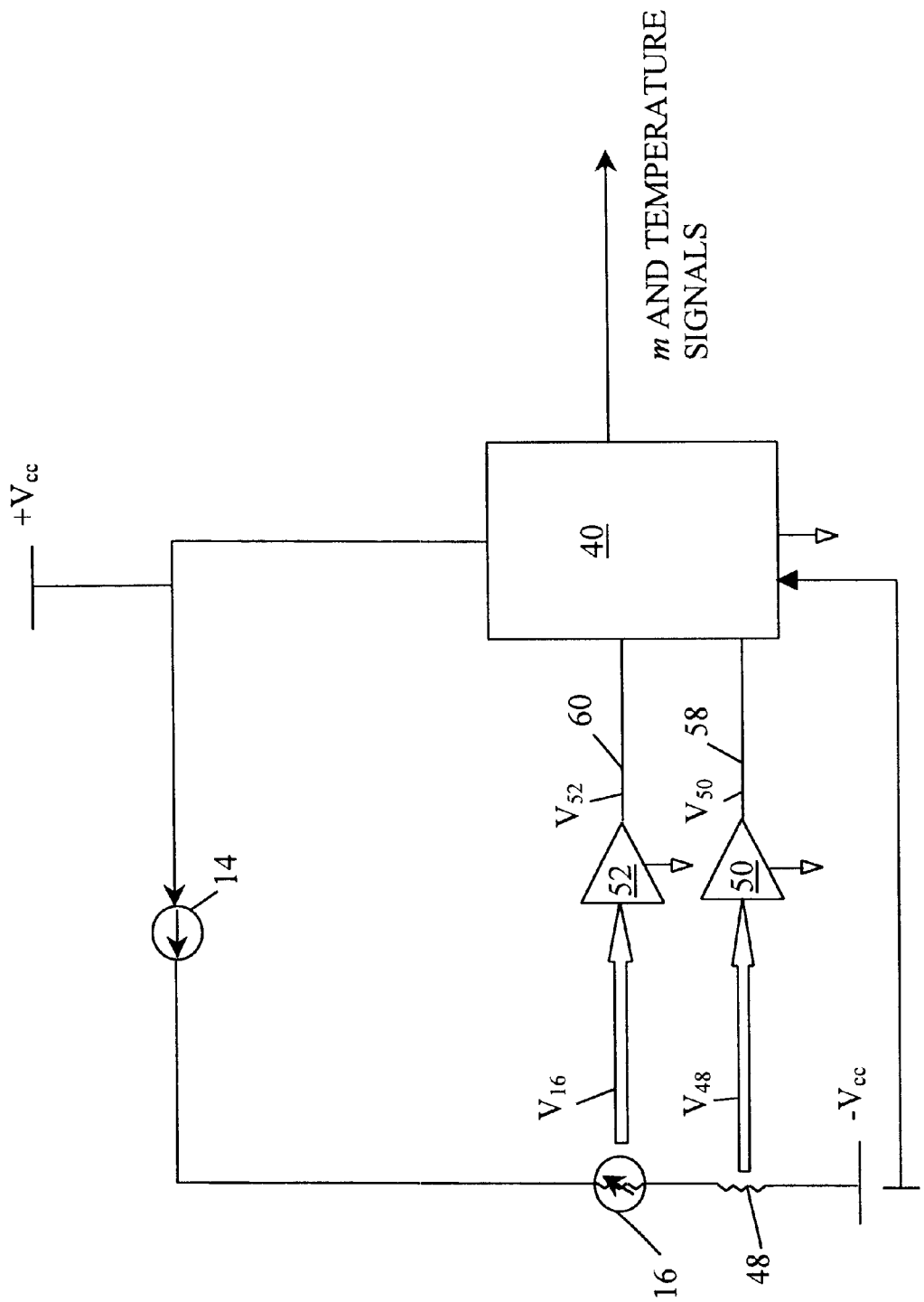

SECTION A-A

FLOW SENSING DEVICE

TECHNICAL FIELD

This invention relates generally to fluid flow measuring devices. More particularly, this invention relates to a thermal based fluid flow measuring instrument utilizing either a fixed ratio parameter or a constant difference arrangement of thermoresistive sensors in determining the mass flow rate of a fluid.

BACKGROUND AND SUMMARY OF THE INVENTION

Methods exist for determining the flow rate for fluids, including gases, flowing through a system, such as a pipe or conduit. Correspondingly, there are many disadvantages associated with these flow rate determination methods. Accordingly, the invention described herein discloses an apparatus for determining the flow rate of a fluid flowing through a system, such as a conduit or a pipe. Advantageously, the apparatus is operable to determine the fluid flow rate economically and without the disadvantages associated with conventional fluid flow rate methods. Additionally, the invention removes the temperature dependence of the thermoresistive sensors inherent in the constant $\Delta T$ methods. This in turn enables the associated $\Delta T$ to be reduced between the heated and reference thermoresistive sensors. In one preferred embodiment, the $\Delta T$ is about 20° C. or less which is preferable for operation in liquid fluids.

More particularly, the invention described herein is operable to separate sensor drift from fluid property (thermal conductivity, viscosity, Prandtl number, etc.) dependence, enabling an independent modeling of the fluid property dependence characteristic. This fluid property dependence is included in a complete and thorough modeling of the heat transfer process using a universal flow correlation and which also includes thermoresistive sensor internal thermal resistance and stem losses. The model is programmed in a microprocessor and calibration constants are obtained by calibration in a primary fluid such as water. The model is then used, along with measurements from the thermoresistive sensors, to calculate mass flow. Use in other fluids is facilitated by substitution of the new fluid thermophysical properties and stem loss characteristics, essentially eliminating recalibration for fluids with known thermophysical properties.

In accordance with the invention, an apparatus is provided for determining a mass flow rate of a fluid having temperatures ranging within an expected range. The apparatus includes a first sensor mounted in the fluid having a resistance that is substantially a linear function of temperature within the expected temperature ranges of the fluid. Also mounted in the fluid is a second sensor having a resistance that is substantially a linear function of temperature within the expected temperature ranges of the fluid. A first current source is connected to the first sensor and applies a current ($I_C$) through and a voltage across the first sensor, producing a first resistance $R_C$ and a first sensor voltage $E_C$. A second current source is connected to the second sensor and applies a current ($I_H$) through and a voltage across the second sensor, producing a second resistance $R_H$ and a second sensor voltage $E_H$. A controller controls the first and second current sources by providing control signals to the first and second current sources that provides a level of current to the heated sensor sufficient to keep the heated to reference sensor resistance ratio constant under all conditions of flow. Proper operation dictates that the ratio of the heated to reference sensors remain fixed so the controller varies the reference sensor current such that the $I_H/I_C$ ratio remains constant. Preferably, the controller produces an output corresponding to the mass flow rate of the fluid, based on the control signals sent to the first and second current sources. This output signal along with a signal representative of the ambient fluid temperature are sent to a microprocessor for precise determination of the fluid mass flow rate. It is preferred that the apparatus is first calibrated prior to measuring mass flow rate of a fluid and the calibration information is stored in the microprocessor memory for utilization in the determination of the mass flow rate. The microprocessor is also configured to calibrate the apparatus in various fluids.

Preferably, the microprocessor includes memory and has various operational modes, including modes of calibration and mass flow rate determination. During the calibration mode, the first and second sensors are located in a fluid having known thermophysical properties. As the fluid is flowing, the controller outputs a signal representative of the current, $I_H$, provided to the second sensor. A fluid temperature signal is also output and the temperature of the calibration fluid may be varied over a range of temperatures corresponding to expected operating temperatures of the apparatus. During calibration, it is also necessary to independently measure the mass flow rate of the fluid. The mass flow rate is measured by the independent instrument over a range of values from about zero to the maximum desired. These three sets of measurements (temperature, mass flow rate and current) are used by the microprocessor to regress an equation derived from thermodynamic principles, including a universal flow correlation, which relates the heated sensor current to the mass flow and which includes the temperature dependent thermophysical properties of the fluid in which the calibration is being conducted. Also included in the equation are expressions for the internal thermal resistance of the heated thermoresistive sensors and for the fraction of power input to the heated sensor which is lost into the stem of the probe. Accordingly, $I_H$ the heated sensor current versus mass flow rate is regressed. The fluid temperature is used to obtain appropriate values of various fluid thermophysical properties at each $I_H$ and mass flow rate using an equation or lookup table. The regression produces a set of constants used in the equation relating the mass flow rate and the heated current which minimizes the percent mass flow rate difference between measured and calculated values of mass flow rate for the specific calibration. These constants are stored in memory along with the fluid thermophysical properties versus temperature and the heated sensor stem loss profile versus mass flow.

During the measurement mode, the $I_H$ versus mass flow rate equation is reformulated for mass flow rate in terms of heated sensor current, $I_H$. Thereafter, for each set of representative $I_H$ and fluid temperature inputs obtained, the equation relating mass flow rate to $I_H$ is solved by the microprocessor in real time, using stored stem loss data and thermophysical properties for the measured temperatures. Furthermore, since the general equation relating mass flow rate to $I_H$ is valid for the sensors calibrated in any fluid, all that is required to measure mass flow rate in an alternate fluid is to substitute the probe stem loss versus mass flow and thermophysical property versus temperature data of the new fluid for that of the calibrated fluid. Although in practice this procedure is currently limited to related classes of fluids such as aqueous, light hydrocarbon, heavy hydrocarbon, etc., the method essentially eliminates recalibration when measuring the mass flow rate of fluids having known thermophysical properties.

In an alternative embodiment of the invention, a device is provided for determining the mass flow rate of a fluid. The device includes a first sensor mounted in the fluid having a resistance which is a substantially linear function of a fluid temperature. The device also uses a second sensor having a resistance which is a substantially linear function of the fluid temperature mounted in the fluid at a location relative to the first sensor. A first current source is connected to the first sensor and applies a fixed current ($I_C$) through and a voltage across the first sensor, producing a first sensor resistance $R_C$ and a first sensor voltage $V_C$. A second current source is connected to the second sensor and applies a current ($I_H$) through and a voltage across the second sensor, producing a second sensor resistance $R_H$ and a second sensor voltage $V_H$. A first fixed resistor produces a signal corresponding to an amount of current ($I_C$) through the first sensor and a second fixed resistor produces a signal corresponding to an amount of current ($I_H$) through the second sensor. The device also includes an analog-to-digital converter for converting the first sensor voltage $V_C$, second sensor voltage $V_H$, first fixed resistor signal and second fixed resistor signal to digitized values, producing digitized output signals therefor. A microprocessor calculates the resistances of the first and second sensors based on the voltages and representative currents. The microprocessor calculates the value of the heated sensor resistance, $R_H$ required to maintain a constant ratio between the first and second sensor resistances ($R_H/R_C$). Based on the difference between measured and required $R_H$ values, the microprocessor directs the heated sensor current, $I_H$, to be increased or decreased. The digital-to-analog converter provides the appropriate control voltage to the heated sensor current source. According to this embodiment, the reference sensor current source remains constant. The entire process is repeated periodically in a manner that provides the appropriate current, under any fluid flow conditions, that maintains the $R_H/R_C$ ratio constant. A fluid ambient temperature is also calculated from the reference sensor resistance. Accordingly, the mass flow rate of the fluid is proportional to the amount of current ($I_H$) required to maintain the ratio $R_H/R_C$ constant. The microprocessor is operable to calibrate the device and to produce an output representing the mass flow rate of the fluid.

In yet another embodiment of the invention, an apparatus is provided for determining the mass flow rate of a fluid having known thermophysical properties. The apparatus includes a sensing means having a resistance which is a function of temperature. A current source is connected to the sensing means and applies a current through and a voltage across the sensing means. A fixed resistor is located in series with the sensing means and the current source, for outputting a signal indicative of the current through the sensing means which is used to calculate resistance of the sensing means. The apparatus also includes a reference sensor operable to provide a signal indicative of the fluid temperature. A processor means determines the mass flow rate of the fluid utilizing the fluid thermophysical properties and calibration information based on a universal flow correlation. The apparatus maintains a constant difference between a temperature of the sensing means and the fluid temperature during calibration and the same difference is maintained during operation of the apparatus to determine the mass flow rate of the fluid. The processor means outputs a signal indicative of the mass flow rate of the fluid based on the calibration information and current provided by the current source to maintain the constant temperature difference.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows:

FIG. 2a is a schematic illustration and block diagram of one embodiment of the invention;

DETAILED DESCRIPTION OF THE INVENTION

Figure 1:
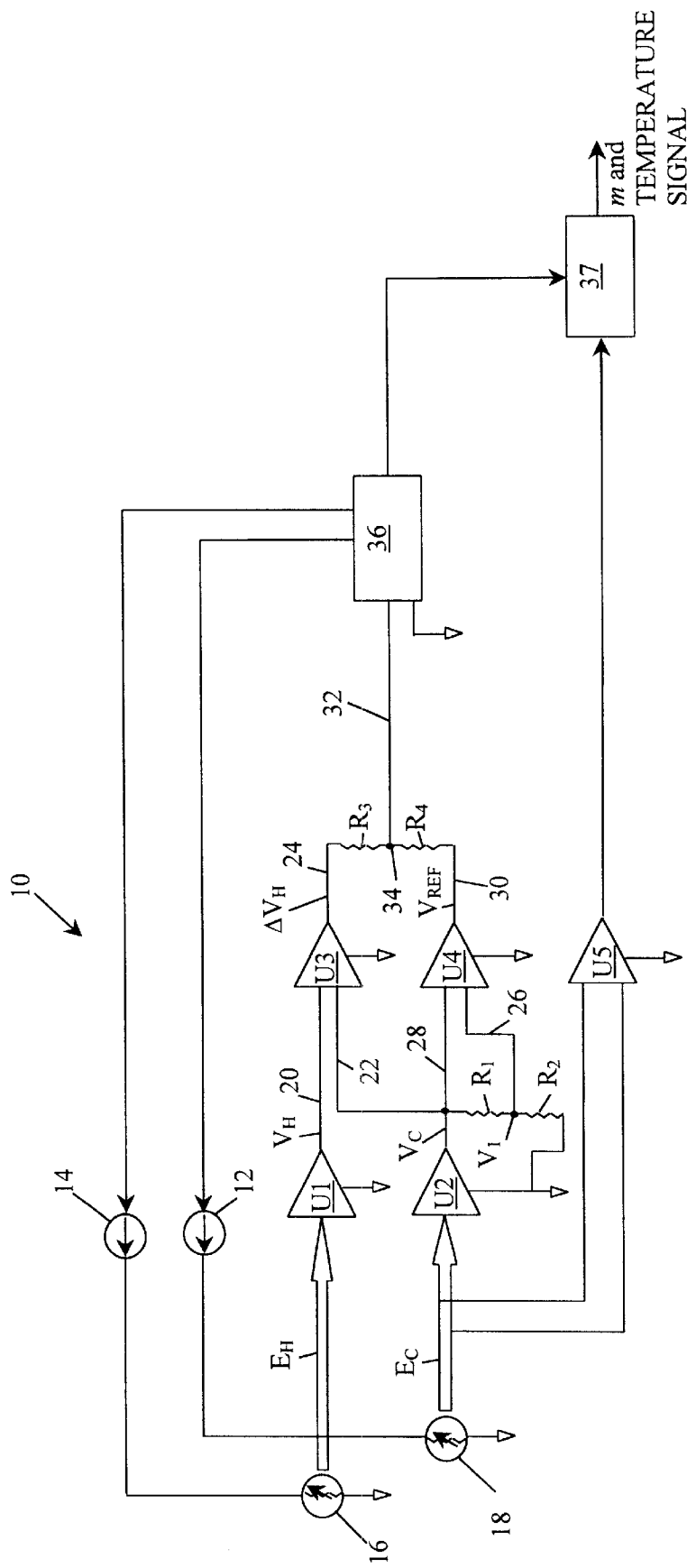
FIG. 1 is a schematic illustration and block diagram illustrating a constant self-heating flow sensing apparatus according to the invention.

Referring now to the Figures in which like reference numerals indicate like or corresponding features, there is shown in FIG. 1 a schematic illustration and block diagram of the flow sensing apparatus 10 used to establish constant self-heating using thermoresistive sensors having a substantially linear resistance temperature dependence within an expected temperature range of the fluid. As used herein, the term mass flow rate is defined to be the fluid density-velocity product multiplied by the cross-sectioal area of the fluid flowing through a pipe, conduit, etc. The apparatus 10 is operable to determine the mass flow rate of the fluid under test. Preferably, the flow sensing apparatus 10 includes the use of resistance temperature detectors (RTDs) having linear, or nearly linear resistance temperature dependencies within the expected temperature ranges of the fluid. As described below, the flow sensing apparatus 10 is operable to determine the mass flow rate of a fluid.

According to the invention, separately controlled current sources 12 and 14, hereinafter cold and hot current sources 12 and 14, respectively, are used to excite a first heated resistance temperature detector 16 and a second reference resistance temperature detector 18. According to a preferred embodiment of the invention, the ratio of the first and second current sources 12 and 14 is maintained constant. Additionally, the hot current source 14 provides an amount of current sufficient to cause self-heating of the heated resistance temperature detector 16. Conversely, the current provided by the cold current source 12 preferably does not cause significant self-heating of the reference resistance temperature detector 18. Most preferably, the reference resistance temperature detector 18 senses the fluid within about 0.1% of the ambient temperature of the fluid.

In one embodiment of the invention, the resistances of the heated and reference resistance temperature detectors 16 and 18 are defined, respectively, as:

$$R_H = R_{OH}(1+\alpha T_A)\gamma_q \tag{1}$$

or, $R_H$ can be expressed as, $$R_H = R_{OH}(1+\alpha T_H) \tag{1a}$$

and, $$R_C = R_{OC}(1+\alpha T_A) \tag{2}$$

where,ps
$R_{OH}$ represents the unheated resistance of the heated resistance temperature detector at about 0° C., $R_{OC}$ represents the resistance of the reference resistance temperature detector at about 0° C, $T_A$ represents the ambient temperature of the fluid, $T_H$ represents the internal temperature of the heated resistance temperature detector, and $\alpha$ represents the sensor temperature coefficient of resistance.

The value for $\alpha$ is dependent upon the material composition of the resistance temperature detector. Typical values for $\alpha$ range from about 0.01 to about 0.001 Ω/Ω/° C., although new materials could include higher $\alpha$'s. Additionally, the self-heating coefficient, $\gamma_q$ is defined as the ratio of $R_H$ to $R_C$, multiplied by the ratio of reference to heated $R_O$ values, i.e.:

$$\gamma_q = \frac{R_H}{R_C} \cdot \frac{R_{OC}}{R_{OH}} \tag{3}$$

As an amount of current is provided through the heated and reference resistance temperature detectors 16 and 18, respectively, voltages develop corresponding to the resistances of the resistance temperature detectors 16 and 18. The heated resistance temperature detector 16 voltage, $E_H$, is passed through a amplifier U1, preferably having an associated gain $G_1$ of about unity while the reference resistance temperature detector 18 voltage, $E_C$, is amplified by amplifier U2 having a gain $G_2$. Preferably, the gain $G_2$ of amplifier U2 is equal to the ratio of the current, $I_H$, provided by the hot current source 14 to the current, $I_C$, provided by the cold current source 12, multiplied by the ratio of heated to reference $R_O$ values, i.e., $$G_2 = \frac{I_H}{I_C} \cdot \frac{R_{OH}}{R_{OC}} \tag{4}$$

Thus, the heated and reference resistance temperature detector voltages become:

$$V_H = I_H R_H G_2 = I_H R_{OH}(1+\alpha T_A)\gamma_q \tag{5}$$

and, $$V_C = I_C R_C G_2 = I_H R_{OH}(1+\alpha T_A) \tag{6}$$

As best shown in FIG. 1, a second set of amplifiers U3 and U4, each preferably having an identical gain of about ten times or greater, the gain being dependent on the voltage level of the input signals. Amplifiers U3 and U4 accept inputs from the amplifiers U1 and U2. Amplifier U3 accepts the voltage signal $V_H$ on line 20 and amplified voltage signal $V_C$ on line 22, developing a difference signal, $\Delta V_H$, on line 24. Amplifier U4 accepts a voltage signal $V_1$ on line 26 and amplified voltage signal $V_C$ on line 28. The voltage signal $V_1$ is a fraction, (1-K), times the amplified $V_C$ signal. The output of amplifier U4 on line 30 is a voltage signal $V_{REF}$, which is equal to K times $V_C$, and is preferably reversed in polarity with respect to the $\Delta V_H$ signal. Accordingly, K is determined by a voltage divider consisting of resistors $R_1$ and $R_2$ where, $$K = \frac{R_1}{R_1 + R_2} \tag{7}$$

The voltages at the outputs of $U_3$ on line 24 and $U_4$ on line 30, respectively, are:

$$\Delta V_H = (1+\alpha T_A)I_H R_{OH}(\gamma_q-1) \tag{8}$$

and, $$V_{REF} = KV_C = K(1+\alpha T_A)I_H R_{OH} \tag{9}$$

Voltages $\Delta V_H$ and $V_{REF}$ are impressed across resistors $R_3$ and $R_4$, respectively, which are preferably equal in value and joined in series (FIG. 1). Line 32 connecting the common node 34 between resistors $R_3$ and $R_4$, is the input to the self-heat controller 36. Preferably, the self-heat controller 36 includes an operational amplifier, having an open loop gain, and having as one input the voltage on line 32 and where the other input is connected to ground. According to the invention, the self-heat controller 36 forces the voltage at node 34 to zero by the adjustment of $I_H$ (and $I_C$ since $I_H/I_C$=constant) to a value maintaining the self-heat coefficient, $\gamma_q$, constant by balancing the heat lost from the heated resistance temperature detector 16 into the fluid stream. It will be recognized that the self-heat controller 36 can be implemented in various configurations and is not limited to the structure described above. For example, a microprocessor, including memory, analog-to-digital and digital-to-analog conversion components can be implemented to perform the control function of the controller 36.

The above described configuration forces $\Delta V_H$ to have a value that equals the fraction of the $V_C$ signal, ie. $V_{REF}$ signal, $KV_C$:

$$KV_C = \Delta V_H \tag{10}$$

$$K = \gamma_q - 1 = \left(\frac{R_{OC}}{R_{OH}} \cdot \frac{R_H}{R_C}\right) - 1 = \frac{R_1}{R_1 \cdot R_2} = \text{a Constant,}$$

$$\frac{R_H}{R_C} = \frac{R_{OH}}{R_{OC}} \cdot \frac{(2R_1 + R_2)}{(R_1 + R_2)} = \text{a Constant,} \tag{11}$$

Accordingly, by adjusting the amount of current $I_H$ and $I_C$ delivered by the cold and hot current sources 12 and 14, the resistance temperature detector resistance ratio is maintained constant under all conditions. This effectively eliminates resistance temperature detector temperature dependence while retaining all the advantages of constant $\Delta T$ type operation. The mass flow rate of the fluid is determined by the amount of current $I_H$ required to maintain the voltage at node 34 at about zero volts. Correspondingly, the controller 36 outputs a flow signal representative of the mass flow rate of the fluid, the flow signal being proportional to the current $I_H$ provided by the hot current source 14. Also provided is a voltage signal output from the amplifier U5 representing the temperature of the fluid.

The output from the controller 36 representative of the mass flow rate of the fluid and the fluid temperature signal output from U5 are provided as inputs to a microprocessor 37. The microprocessor 37 includes memory and has various modes of operation. As described in greater detail below, it is preferred that the microprocessor 37 include multiple modes of operation, including a calibration mode and a measurement mode. During the calibration mode, the microprocessor 37 utilizes the above described inputs, along with independent mass flow rate information to calibrate the apparatus 10. The independent mass flow rate information is determined by independent mass flow rate instrumentation, such as a Coriolis mass flow rate meter. A series of data points over a range of mass flow rate values are used in a calibration to provide calibration constants for a general mass flow equation relating heated sensor current $I_H$ to mass flow rate for a particular fluid.

During the measurement mode of operation, the mass flow rate equation, derived from thermodynamic principles, is rearranged and implemented in the microprocessor 37, so that a mass flow rate of a fluid is calculated on a real time basis, utilizing the $I_H$ and fluid temperature signals. Fluid thermophysical properties versus temperature, for each specific fluid for which mass flow rate is to be determined are included as stored data, or may be determined on a real time basis using known equations, so that fluid property versus temperature information is available for use in the mass flow rate equation. Probe stem loss versus mass flow for each fluid must also be calculated and provided as an equation or look up table. This data may be obtained by finite element analysis of the probe and fluid.

For this embodiment of the invention, when a mass flow rate determination is desired, resistance temperature detectors 16 and 18 are located in a fluid to which a measurment of mass flow rate is desired, preferably after calibrating the apparatus 10. It is also preferred that the thermophysical property and probe stem loss information for various fluids is already stored in the memory of the microprocessor. As described further below, however, a plurality of resistance temperature detectors can be located in a fluid to obtain an average mass flow rate measurement. This is particularly useful for fluid flows that are not well behaved.

As an example, a description of apparatus 10 is first described for an increasing amount of flow. Based on the characteristics of the flow and the fluid properties, the heated resistance temperature detector 16 provides information representative of the mass flow rate of the fluid. Likewise, the reference resistance temperature detector 18 provides a temperature reference for the heated resistance temperature detector 16 along with an indication of the fluid temperature. The controller 36 monitors the signal at the node 34 on line 32.

An amount of current is provided to both resistance temperature detectors 16 and 18, maintaining a constant current ratio, $I_H/I_C$. Accordingly, the resistance temperature detectors 16 and 18 develop voltages based on their resistances. Moreover, the heated resistance temperature detector 16 develops an amount of additional self-heating resistance due to an increase in the amount of current $I_H$ provided by the current source 14. Since the reference resistance temperature detector 18 does not develop substantial self-heating, the heat removed from the heated resistance temperature detector 16 due to an increased amount of fluid flow and the current $I_H$ required to maintain the ratio, $R_H/R_C$ constant is representative of the mass flow rate of the fluid.

As the mass flow rate of the fluid increases, heat is removed from the heated resistance temperature detector 16 according to the physical laws of thermodynamics. Correspondingly, the resistance of the heated resistance temperature detector 16 decreases and a potential is developed at the node 34. Based on the potential at node 34, the controller 36 sends control signals to the current sources 12 and 14, causing the adjustment of the currents $I_H$ and $I_C$, maintaining the ratios, $I_H/I_C$ and $R_H/R_C$ constant. As described above and in greater detail below, the microprocessor 37, after digitizing the signal output from the controller 36 representative of the mass flow rate and the signal representing fluid temperature, determines the mass flow rate of the fluid, including the thermophysical properties of the particular fluid under test.

Figure 2:
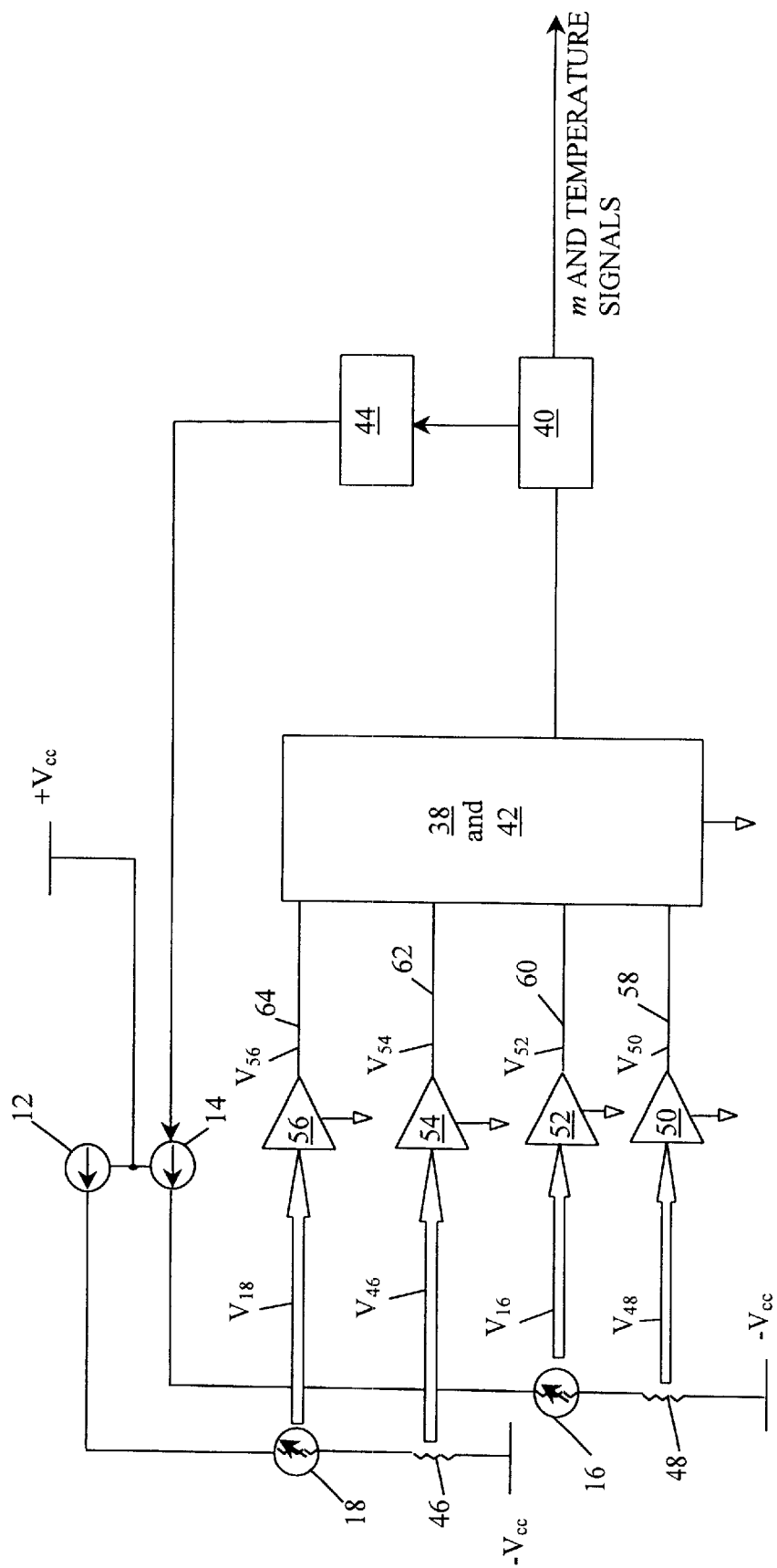
FIG. 2 is a schematic illustration and block diagram illustrating a constant self-heating flow sensing apparatus according to an alternative embodiment invention.

In an alternative embodiment of the invention, a device for determining the mass flow rate of a fluid is preferably implemented using an analog-to-digital converter (ADC) 38, microprocessor 40 including a memory, multiplexer 42, and a digital-to-analog converter (DAC) 44 (FIG. 2). According to the alternative embodiment of FIG. 2, a first measuring resistor 46, having a resistance of between about 1 ohm and about 10 ohms is located in series with the reference resistance temperature detector 18, voltage source, $-V_{CC}$ and the cold current source 12 of constant value. Accordingly, voltages, $V_{18}$ measured across the reference resistance temperature detector 18, and $V_{46}$ measured across measuring resistor 46 are input to instrumentation amplifiers 56 and 54. Since the resistance of resistor 46 is known, the microprocessor 40 is able to determine the current $I_C$ through the reference resistance temperature detector 18 by using the voltage $V_{54}$ output on line 62 from amplifier 54, according to Ohm's law (I=V/R). A second measuring resistor 48, having a resistance of between about 0.1 ohm and about 10 ohms is located in series with the heated resistance temperature detector 16, voltage source, $-V_{CC}$ and the hot current source 14. Similarly, voltages, $V_{16}$ measured across the heated resistance temperature detector 16, and $V_{48}$ measured across the second measuring resistor 48 are input to operational amplifiers 52 and 50. Again, since the resistance of resistor 48 is known, the microprocessor 40 is able to determine the current $I_H$ through the heated resistance temperature detector 16 by using the voltage $V_{50}$ output on line 58 from amplifier 50.

As described above, the voltages $V_{16}$, $V_{18}$, $V_{46}$ and $V_{48}$ are amplified through the stage of amplifiers 50, 52, 54 and 56, each having a gain of between about one and about one-hundred (100), outputting voltages, $V_{50}$, $V_{52}$, $V_{54}$ and $V_{56}$ which are input to the multiplexer 42 on lines 58, 60, 62 and 64. According to the multiplexing logic of the multiplexer 42, the signals on the lines 58–64 are presented to the analog-to-digital converter 38, digitizing the analog signals on lines 58–62. Alternatively, the conversion to the digital domain can precede the multiplexer function, wherein the multiplexing logic determines the presentation order of the digitized signals to the microprocessor 40. These digitized signals are input to the microprocessor 40 for further processing. Based on the current $I_C$ determined above, and the voltage $V_{18}$ output from the reference resistance temperature detector 18, the microprocessor 40 computes the resistance, $R_C$, of the reference resistance temperature detector 18. Similarly, the microprocessor 40 determines the resistance, $R_H$, of the heated resistance temperature detector 16 based on the current $I_H$ determined above, and the voltage $V_{16}$ output from the heated resistance temperature detector 16. According to this embodiment of the invention, the microprocessor 40 sets a fixed resistance ratio $$\frac{R_H}{R_C} \cdot \frac{R_{OC}}{R_{OH}},$$

computed from the determined reference and hot resistance values, $R_C$ and $R_H$, and the $R_O$ values for each resistance temperature detector 16 and 18.

During operation of the above described alternative embodiment of the invention, the resistance temperature detectors 16 and 18 are located in a fluid flow wherein it is desired to determine the mass flow rate of the fluid. As described above, the microprocessor 40 monitors the digitized voltages $V_{50}$, $V_{52}$, $V_{54}$ and $V_{56}$, calculating the current $I_H$, and controlling the amount of current $I_H$ provided to the heated resistance temperature detector 16 through the digital-to-analog converter 44. By controlling the heated current $I_H$, the microprocessor 40 is operable to maintain the fixed heated to reference resistance temperature detector resistance ratio, $$\frac{R_H}{R_C} \cdot \frac{R_{OC}}{R_{OH}}.$$

According to this alternative embodiment of the invention, the reference resistance temperature detector 18 is provided with a constant current, $I_C$, since it is not necessary to maintain a constant ratio between $I_H$ and $I_C$ for this implementation. As described above it is preferred that the device be calibrated in, or have calibration data for, various fluids, and the calibration information is already stored in the memory of the microprocessor 40 before making substantive measurements, thereby obtaining a more precise determination of the mass flow rate of the fluid. The mass flow rate of the fluid is determined by the microprocessor 40 based on the current $I_H$ required to maintain the fixed ratio $$\frac{R_H}{R_C} \cdot \frac{R_{OC}}{R_{OH}},$$

as described below. The microprocessor 40 provides a mass flow rate signal, proportional to the heated resistance temperature detector current $I_H$, which is also output to digital signal processing circuitry. The resistance of the reference resistance temperature detector 18 is also converted into a temperature signal in the microprocessor 40 in accordance with equation (2), being representative of the ambient temperature of the fluid, where it is also preferred to output the temperature signal to the digital signal processing circuitry.

The systems described above provide a current signal which is representative of the mass flow rate of the fluid and, furthermore, do not contain the temperature dependence of the resistance temperature detectors. However, the temperature dependence of the fluid thermophysical properties, included in the heat transfer coefficient, h, is still present. Additionally, it is normally necessary to calibrate the system for each fluid in which a measurement is required. According to a most preferred embodiment of the invention, these limitations can be overcome by accurately modeling the heat transfer process and including the actual values of the fluid thermophysical properties within the system architecture.

Figure 3:
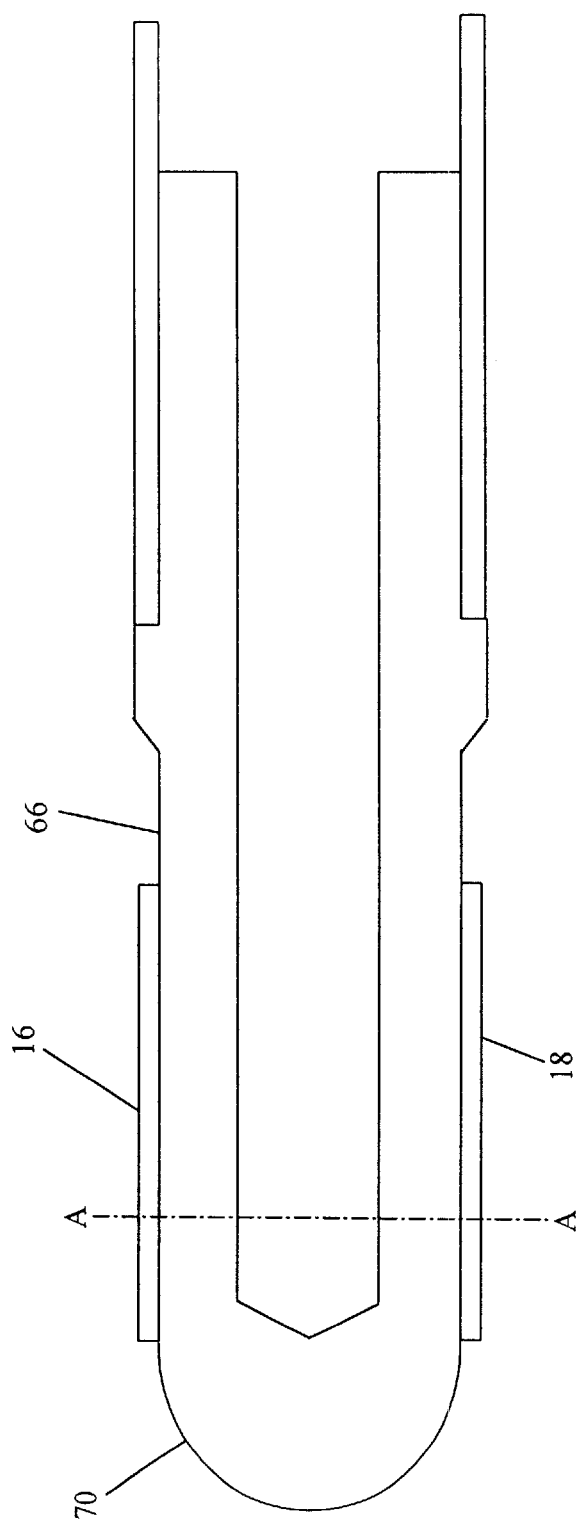
FIG. 3 is a side view of a sensor probe and a corresponding sectional view taken along line A—A; and, FIG. 4 is an elevational view of a sensor probe according to an alternative embodiment of the invention.
Figure 3:
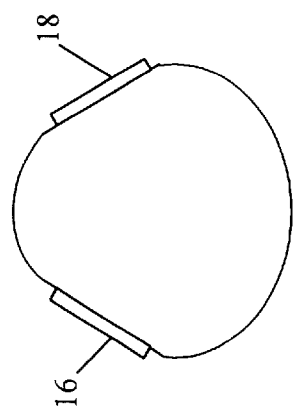

To accurately model the heat transfer process, the invention includes two additional features for measuring mass flow rate of a fluid using resistance temperature detectors. The first feature is compensation for the heat lost by conduction and convection through the stem 66 and the probe 70 containing the heated resistance temperature detector 16 (FIG. 3). The second feature is compensation for the temperature drop within the heated resistance temperature detector 16 due to the internal thermal resistance of the device 16. It is most preferred that the microprocessors of the systems described above include these features in the determination of the mass flow rate of the fluid as a function of the current $I_H$, as described below.

According to the first law of thermodynamics, from a heat balance of the heated resistance temperature detector 16 and the probe 70 in the fluid stream, the power required to heat the heated resistance temperature detector 16 must be balanced by the convective heat transferred to the fluid from the heated resistance temperature detector 16 and the heat lost into the probe 70 and through the probe stem 66 by conduction and convection to the fluid.

$$w = q_C + q_L \tag{12}$$

where, $w = I_H^2 R_H$ is the heat input to the heated resistance temperature detector 16, $q_C$ is the convective heat loss from the heated resistance temperature detector 16, and $q_L$ is the heat loss through the the probe stem 66 and the probe 70.

The convective heat loss is $$q_C = h A_S (T_S - T_A) \tag{13}$$

where, h=the heat transfer coefficient to the fluid which contains the mass flow rate information, $A_S$=the resistance temperature detector surface area, $T_S$=the surface temperature of the resistance temperature detector 16, and $T_A$=the fluid temperature.

According to a preferred embodiment of the invention, the heated resistance temperature detector 16 includes an embedded resistive element. Because of the thermal resistance between the surface of the heated resistance temperature detector 16 and the embedded resistive element within, a temperature difference, $\Delta T_T$, is developed as heat is transferred from the resistive element to the surface of the heated resistance temperature detector 16, i.e., $$\Delta T_T = T_H - T_S = q_C R_T \tag{14}$$

where, $R_T$ is the internal thermal resistance of the heated resistance temperature detector 16.

The heat loss can be defined as a fraction of the total heat input:

$$q_L = L_S I_H^2 R_H \tag{15}$$

where, $L_S$ is the fraction of the total power input ($I_H^2 R_H$) lost into the probe 70 and through the probe stem 66.

Combining equations (12) through (15) and solving for $I_H^2$ gives:

$$I_H^2 = \frac{h * A_S (T_H - T_A)/R_H}{(1 + h * A_S * R_T)(1 - L_S)} \tag{16}$$

Equation (16) includes the internal thermal resistance $R_T$ of the heated resistance temperature detector 16 and the probe loss characteristic $L_S$. Combining equation (16) with equations (19), (19a), (19b), and (20) (see below), gives a relationship between the current provided to the heated resistance temperature detector 16 from the heated current source 14 and the mass flow rate of the fluid. Accordingly, and with additional reference to FIG. 2a, yet another embodiment of the invention is described. According to this embodiment of the invention, it is not necessary to maintain a constant resistance ratio between currents or resistances. All that is required is to maintain a constant difference between the temperature of the heated resistive temperature detector 16 and the fluid temperature ($T_H - T_A$). As described above, the current and voltage across the heated resistance temperature detector 16 are determined along with the ambient fluid temperature, and the above described combination of equations are utilized to determine the mass flow rate of the fluid. However the mass flow is best determined by measurement of the product of the heated sensor current and voltage. This is readily accomplished with the digital implementation but requires a signal proportional to voltage be added to the output for the analog version. Also note that for the expression (equation (16)) to be free of sensor temperature dependence ($R_H$) the power must be measured, not simply $I_H$ as with the constant ratio case. Preferably, as shown in FIG. 2, and as described above, the voltage across and current flowing through the heated resistance temperature detector 16 are determined. Also, as described above, the reference resistance temperature detector 18 can be used to determine the ambient temperature of the fluid, as shown in FIG. 2. Alternatively, an independent temperature measurement of the fluid can be made with a thermistor, thermocouple, or other suitable sensor.

As shown in FIG. 2a, the microprocessor 40 includes the analog-to-digital, and digital-to-analog conversion components, as described above. Based on equation (16), this embodiment requires the same value, a constant, ($T_H$-$T_A$), during the calibration and measurement mode of operation. Accordingly, linear resistance temperature detectors are not required for this embodiment. However, this alternative embodiment can also utilize linear resistance temperature detectors, and utilize equation (17) to instead maintain a constant ($R_H$-$R_C$) value during the calibration and measurement mode of operation.

After combining equations (16), (19), (19a), (19b) and (20), an equation (22) is determined relating $I_H$, $R_H$, ($T_H$-$T_A$) (or, alternatively ($R_H$-$R_C$) for linear resistance temperature detectors), mass flow rate, thermophysical fluid properties, operational constants determined by calibration, and the probe stem loss characteristics.

Preferably, for the constant ratio mode of operation, a different expression relating $I_H$ with mass flow rate is implemented in the microprocessor, utilizing the linearity of the resistance temperature detectors. Accordingly, since the resistance temperature detectors 16 and 18 have a linear resistance versus temperature dependence, $$T_H - T_A = \frac{1}{\alpha R_{OH}}\left(R_H - \frac{R_{OH}}{R_{OC}} \cdot R_C\right) \tag{17}$$

Combining equations (16) and (17) and recognizing the relationship for $\gamma_q$ from Equation (3) gives, $$I_H^2 = \left(\frac{\gamma_q - 1}{\gamma_q}\right)\left(\frac{A_S}{R_{OH} * \alpha}\right)\left(\frac{h}{(1 + h * A_S * R_T)(1 - L_S)}\right) \tag{18}$$

Equation (18) expresses the heated resistance temperature detector current, $I_H$, in terms of the resistance temperature detector, probe, and operational constants. The expression for $L_S$ in terms of mass flow rate or $I_H$ is a complicated expression depending on the probe geometry and material properties, as well as the fluid flow and thermophysical properties, and is preferably derived separately and included in equation (18) as a simplified equation. Alternatively, the expressions for $L_S$ can be input into the microprocessors 37 or 40 as a look-up table, or with sufficient computational power, $L_S$ is calculated on a real-time basis.

The primary advantage of including $L_S$ and fluid thermophysical properties in equations derived from a thermodynamic model is that calibration can take place in a single primary fluid and, with suitable substitution of alternate fluid thermophysical properties and calculation of probe stem loss information, operation in alternate fluids without recalibration is possible. This generalized intermedia calibration scheme relies on a universal flow correlation as described below.

The heat transfer coefficient, h, is generally converted to mass flow rate and fluid thermophysical properties using a universal flow correlation.

$$Nu = C_1 + C_2 Pr^{1/3} R_e^n \tag{19}$$

where, $$Nu = hd/k \text{ is the Nusselt number,} \tag{19a}$$

d=probe diameter, k=fluid thermal conductivity, $C_1$ and $C_2$=constants determined by calibration, Pr=Prandtl number for the fluid, $$R_e = (\rho V) d/\mu = \text{Reynolds number,} \tag{19b}$$

where, $\rho V$=fluid mass velocity, $\rho$=fluid density,

V=fluid velocity, $\mu$=fluid viscosity, and n=Reynolds number exponent determined by calibration.

Other universal correlations are available, but it is preferred to use the above correlation (equation (19)). By using equation (19), the system is operable to measure the mass flow rate of any fluid, without unnecessary and inefficient calibration for every fluid, as described further below Additionally, the mass flow rate, m, can be expressed as:

$$m = (\rho V) A_P, \tag{20}$$

where, $A_P$ is the cross-sectional area of the fluid flow flowing in the pipe or conduit in which the probe 70 is located.

Accordingly, when equations (19) and (20) and the expressions for Nu and $R_e$ are combined with equation (18), an expression for $I_H$ in terms of mass flow, fluid thermophysical properties, probe 70 dimensions and thermal resistance $R_T$, and parameters $C_1$, $C_2$ and n is obtained:

$$I_H^2 = \tag{21}$$

$$\left(\frac{\gamma_q - 1}{\gamma_q}\right)\left(\frac{A_S * k}{R_{OH} * \alpha * d}\right)\left(\frac{C_1 + C_2\left(\frac{d}{\mu * A_P}\right)^n Pr^{1/3} m^n}{(1 + C_1 A_S R_T(k/d)) + (C_2 A_S R_T(k/d)(d/A_P\mu)^n Pr^{1/3} m^n)(1 - L_S)}\right)$$

A similar expression for the constant ($T_H$-$T_A$) case is obtained by combining equation (16) with equations (19), (19a), (19b) and (20). However mass flow is determined in terms of power ($V_H R_H$) instead of $I_H$ alone. If constant ($R_H$-$R_C$) is desired ($T_H$-$T_A$) is converted to resistance difference using equation (17).

$$V_H I_H = \frac{A_S k}{d}\left(\frac{(T_H - T_A)\left(C_1 + C_2\left(\frac{d}{\mu * A_P}\right)^n Pr^{1/3} m^n\right)}{(1 + C_1 A_S R_T(k/d)) + (C_2 A_S R_T(k/d)(d/A_P\mu)^n Pr^{1/3} m^n)(1 - L_S)}\right) \tag{22}$$

As described above, the microprocessors 37 and 40 include various modes of operation. During the calibration mode, the resistance temperature detectors 16 and 18 are located in a fluid having known thermophysical properties. As described above, an independent measurement of the ambient temperature can be found without utilizing a reference resistive temperature detector 18. In both the analog and digital implementations described above, the calibration mode is operationally the same, so that one description is sufficient for the analog and digital implementations of the invention. Accordingly, as the fluid is flowing, the microprocessor 40 (or controller 36 for the analog implementation) outputs a signal representative of the current, $I_H$ provided to the heated resistance temperature detector 16 to maintain a constant resistance ratio, or alternatively the microprocessor 40 outputs a signal representative of the power ($V_H I_H$) for a constant ($T_H-T_C$) or ($R_H-R_C$) difference.

The fluid temperature signal is also utilized during the calibration mode of operation. Additionally, it is preferable to independently measure the mass flow rate of the fluid, for example using a Coriolis type instrument. According to the calibration mode, the mass flow rate is measured by the independent instrument over a range of values from about zero to the maximum mass flow rate desired. These three sets of measurements are used by the microprocessor 40 to regress equation (21) or equation (22) for the constant difference implementation, relating the heated sensor current $I_H$ (or the $I_H V_H$ product for constant ($T_H-T_A$)) to the mass flow rate, including the temperature dependent thermophysical properties of the fluid in which the calibration is being conducted as well as the probe stem loss versus mass flow information which is normally calculated independently for each fluid and probe design. These thermophysical properties and stem loss values can be stored in the microprocessor 40 as a look-up table, interpolation map, or calculated real-time. Accordingly, $I_H$, the heated sensor current (or $I_H V_H$, the heated sensor power) versus mass flow rate is regressed until the constants, $C_1$, $C_2$, n and $R_T$ are obtained. The fluid temperature is used to obtain appropriate values of various fluid thermophysical properties at each $I_H$ (or $I_H V_H$) and mass flow rate. The regression produces a set of constants used in the mass flow rate equations which minimize the percent mass flow rate difference between measured and calculated values of mass flow rate for the specific calibration. These constants are stored in the microprocessor memory along with the fluid thermophysical properties versus temperature and probe stem loss versus mass flow data.

The apparatus may be calibrated in the fluid in which it operates or may be calibrated in a primary fluid and operated, without recalibration, in other related fluids. For the first case the calibration sequence described above directly applies. For the second case the probe is calibrated in a primary fluid as described above. It is preferred that the apparatus 10 is calibrated in a primary fluid within three categories: aqueous, light hydrocarbon and heavy hydrocarbon. However, it is possible to calibrate in one or more than one type of fluid depending on the particular measurement application. After calibrating in the primary fluid the regressed constants $C_1$, $C_2$, n, and $R_T$ are retained. A new probe stem loss profile is calculated for each fluid for which operation is desired and thermophysical properties for each new fluid are obtained. To operate in the new fluid, stem loss and thermophysical properties of that fluid are substituted for those of the primary fluid.

During the measurement mode of operation, the microprocessor 40 (microprocessor 37 in the analog implementation) implements a reformulated mass flow rate equation (dependent on the constant ratio or constant difference implementation), i.e. for mass flow rate in terms of heated sensor current, $I_H$ or $I_H V_H$ product. Thereafter, for each set of representative $I_H$ and fluid temperature inputs obtained, the equation relating mass flow rate to $I_H$ (or $I_H V_H$) is solved by the microprocessor 40 in real time, using stored thermophysical properties for the measured temperatures. Or, as described above, the thermophysical properties can be realized in real time by the microprocessor 40 according to well known thermophysical equations. Each time the representative mass flow rate equation is solved according to a dynamic mass flow rate or temperature fluctuation, the microprocessor 40 outputs a mass flow rate signal, informing a user of the mass flow rate of the fluid under test.

According to the invention, since the general equation (equations (21) or (22)) relating mass flow rate to $I_H$ (or $I_H V_H$) are valid for resistance temperature detectors calibrated in any fluid, all that is required to measure mass flow rate in an alternate fluid is to substitute the thermophysical property versus temperature data and the stem loss information of the new fluid for that of the calibrated fluid. Stem loss information for a given sensor design and fluid is best calculated using a finite element based thermal analysis model. Recalibration is eliminated when measuring the mass flow rate of fluids having known thermophysical properties, improving the accuracy and reducing the set-up time of the system.

The microprocessor 40, including the multiplexer 42, analog to digital converter 38 used to convert input analog signals, and the digital to analog converter used to reconvert calculated current, $I_H$ values, to analog form, is equipped with software that provides the equation for the thermal model as well as calibration software. Furthermore. the microprocessor 40 includes calibration constants stored in memory, sensor stem loss versus mass flow rate data for a specific sensor and fluid, and thermophysical property information versus fluid temperature data for each fluid which mass flow rate measurement is intended. Outputs include, but are not limited to, fluid mass flow rate and temperature in analog or digital form. Digital communication is provided for configuration and control functions.

The microprocessor 40 can be directed via the communication link to operate in either calibration or measurement mode. If calibration constants are not present in memory or if new calibration constants are desired, the calibration mode is implemented. For example, in this mode, a series of synchronized inputs of heated resistance temperature detector current and reference resistance temperature detector voltage representing fluid temperature are obtained along with an independent mass flow rate measurement, from zero to the maximum desired, to develop a data file used for calibration.

To calibrate, the input data are used in a regression of heated sensor current $I_H$ versus mass flow rate using equations (21) or (22). The regression compares the $I_H$ versus mass flow rate data with the equation and regresses to minimize the percent mass flow difference between the two. The regression produces four constants: $C_1$, $C_2$, the resistance temperature detector thermal resistance $R_T$, and the Reynolds number exponent n. The Reynolds number exponent n may not be a single value but the regression may be operable to provide a range of n values ranging linearly from a minimum value at the lowest flow rates to a maximum value at the highest flow rates. Thermophysical properties, k, $\mu$, and Pr for the fluid are used in the equation based upon fluid temperature as is the probe stem loss $L_S$ versus mass flow rate.

Once obtained, the calibration constants are stored in memory. To determine mass flow rate versus $I_H$ and fluid temperature, the microprocessor 40 is directed via the communication link to operate in the measurement mode. In this mode, the software includes the thermal model represented by equations (21) or (22) in which the equation is reformatted to calculate mass flow rate in terms of $I_H$ (or $I_H V_H$). Fluid thermophysical properties versus temperature and sensor stem loss versus mass flow rate are obtained from memory as before as each real time set of $I_H$ and temperature inputs are converted into mass flow rate.

Since the flow correlation equation (equation (19)) is a universal flow equation pertaining to all fluids, the constants from the calibration in one fluid are valid for other fluids. All that is necessary is to substitute the thermophysical properties of the alternate fluid for those of the fluid in which the calibration was performed. Also needed is the stem loss ($L_S$) profile versus mass flow rate of the probe and resistance temperature detector with the alternate fluid. Measurement accuracy in the alternate fluid depends on the accuracy of the expressions for $L_S$ and the thermophysical properties. However, this method provides for the generalized thermal based mass flow rate measurement of different fluids based upon calibration in one fluid.

As an example, utilizing a well behaved flow stream profile, a single set of heated and reference resistance temperature detectors 16 and 18, with the heated resistance temperature detector placed at about ¾ radius in a fluid flow provides an accurate representation of the average mass flow rate in laminar or turbulent flow. However, it is not always possible to control the profile through flow conditioning or other means, and accordingly, it is not always possible to obtain an accurate representation of the average flow by measurement at a single point.

Therefore, in another embodiment of the invention, multiple sets of resistance temperature detectors 16 and 18, and associated electronics are employed, wherein the output currents from each device are averaged to provide an $I_H$ (or $I_H V_H$) value representative of the average mass flow rate of the fluid. It is possible to miniaturize the resistance temperature detectors and electronics to make this economically feasible but with such miniaturization, accurate measurement of non-ideal flows is readily accomplished.

Figure 4:
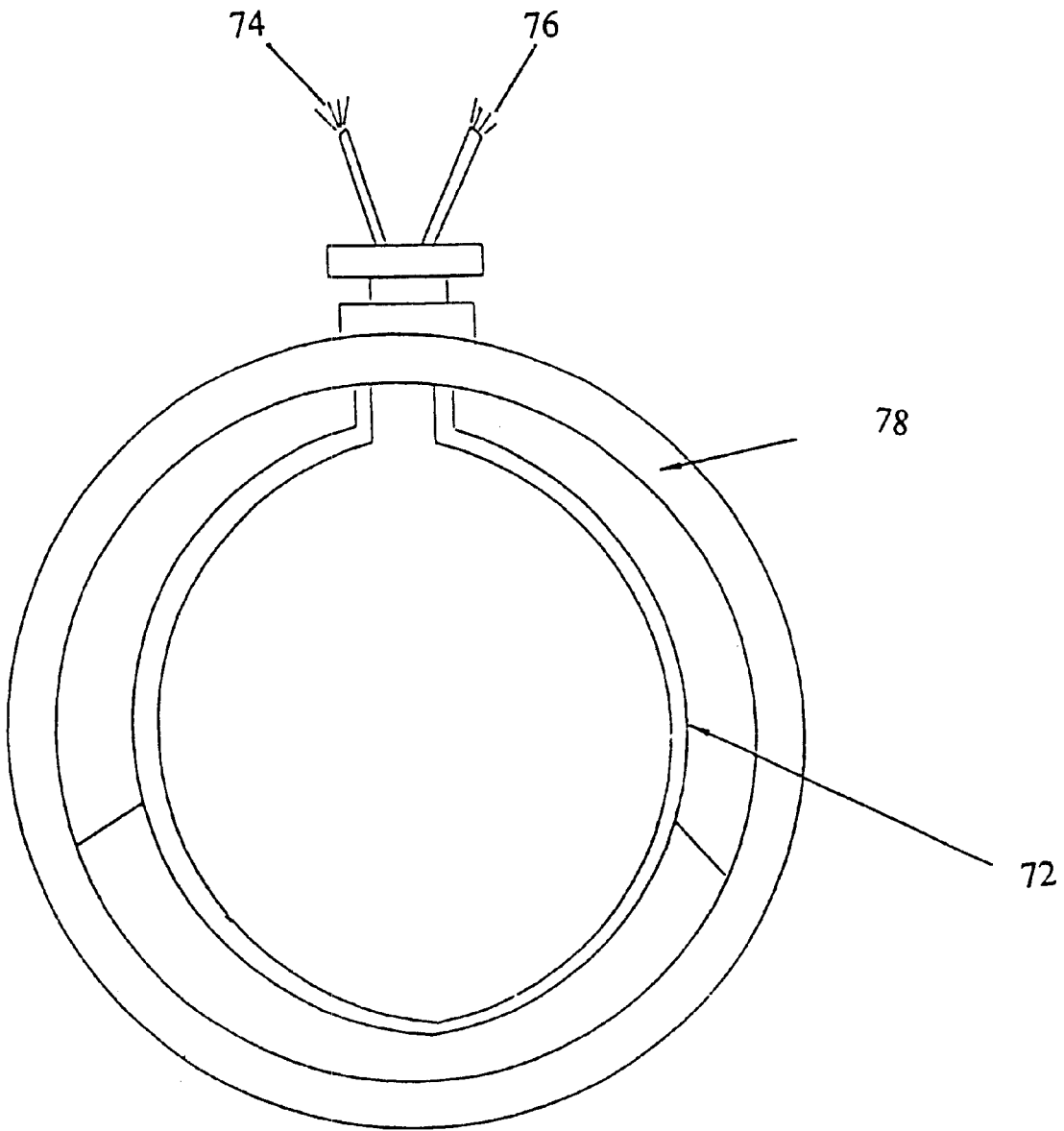

In yet another embodiment of the invention, an averaging sensor 72 is utilized to obtain an accurate representation of a non-idealized flow profile. According to this embodiment, the averaging sensor 72 is not a point but a line, disposed within the flow stream in such a manner as to obtain an average of the profile (FIG. 4).

Preferably, the averaging sensor 72 is a metal sheathed cable with both heater and resistance temperature detector material embedded within the cable sheath in an electrically isolating but thermally conducting material such as alumina. The cable is disposed in a circle within the fluid stream at approximately the ¾ radius position so that essentially the entire circumference of the averaging sensor 72 is included in the flow. As shown in FIG. 4, the cable ends 74 and 76 exit the flow stream pipe 78 where connections are made to a heater and sensor.

Another embodiment of the invention, useful for non-electrically conducting fluids, is to use Inconel or similar metals having very low temperature coefficients of resistance as the sheath, and then electrically heating the sheath. Accordingly, a lower thermal resistance is realized, since the sheath is in direct contact with the fluid. In this case a resistance temperature detector or other suitable sensor such as thermocouple or thermistor is placed within the heated sheath to measure the sheath temperature, $T_H$. Fluid ambient temperature, $T_A$, can be measured with a resistance temperature detector or Is other suitable temperature sensor as well. Equation (21) is used for a constant resistance or temperature ratio and equation (22) is used for constant resistance or temperature difference.

Other embodiments of the invention use Kapton or Teflon flexible sensors. These materials are amenable to a large variety of sensors which may be developed for optimum operation in a particular process environment.

The electrical configuration for interfacing averaging sensors which have separate heaters is similar to the electronics of FIG. 1 except the controller 36 or microprocessor 40 controls current to the separate heaters instead of the self-heated sensor. Multiple and averaging resistance temperature detectors extend the usefulness of the system to include non-ideal flow patterns and very large cross sectional areas of flow. They are applicable to both liquids and gases and, with the noted modifications, are compatible with the constant self-heat electronics.

It is contemplated, and will be apparent to those skilled in the art from the preceding description and the accompanying drawings, that modifications and changes may be made in the embodiments of the invention. While the present invention has been disclosed in connection with, it will be appreciated that these methods are applicable to other fluid flow measurement techniques as well. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. An apparatus for determining the mass flow rate of a fluid comprising:

a first sensor mounted in the fluid, the first sensor having a resistance which is a substantially linear function of a fluid temperature within an expected temperature range of the fluid, a second sensor mounted in the fluid, the second sensor having a resistance which is a substantially linear function of the fluid temperature within an expected temperature range of the fluid, a first current source connected to the first sensor and applying a current ($I_C$) through and a voltage across the first sensor, producing a first sensor resistance $R_C$ and a first sensor voltage $V_C$, a second current source connected to the second sensor and applying a current ($I_H$) through and a voltage across the second sensor, producing a second sensor resistance $R_H$ and a second sensor voltage $V_H$, and the first and second sensors producing sensor signals corresponding to $V_C$ and $V_H$, processor means for receiving and processing the sensor signals for determining the resistance ratio between $R_H$ and $R_C$, for controlling ($I_H$) of the second current source, for determining the mass flow rate of the fluid based on the current ($I_H$) required to maintain a constant resistance ratio between the second sensor resistance $R_H$ and the first sensor resistance $R_C$, and for producing a mass flow rate signal indicative of the mass flow rate of the fluid.

2. The apparatus of claim 1 wherein the processor means further includes memory including calibration information corresponding in part to thermophysical properties of the fluid utilized in the determination of the mass flow rate of the fluid.

3. The apparatus of claim 2 wherein the processor means further includes a universal flow correlation algorithm for utilizing the calibration information in determining the mass flow rate of the fluid.

4. The apparatus of claim 3 wherein the universal flow correlation algorithm includes an equation:

$$Nu = C_1 + C_2 Pr^{1/3} R_e^n$$

where,

Nu=hd/k is the Nusselt number,
h=the heat transfer coefficient to the fluid,
d=probe diameter wherein the first and second sensors reside,
k=fluid thermal conductivity,
$C_1$ and $C_2$=constants determined by calibration,
Pr=Prandtl number for the fluid, $$R_e = (\rho V)d/\mu = \text{Reynolds number,}$$

where, $\rho V$=fluid mass velocity,
$\rho$=fluid density,
V=fluid velocity,
$\mu$=fluid viscosity, and
n=Reynolds number exponent determined by calibration.

5. The apparatus of claim 4, wherein the processor means determines the mass flow rate using an algorithm that includes elements of the universal flow correlation equation and compensation factors for heat lost by conduction in the second sensor and temperature drop within the second sensor due to an internal thermal resistance, and includes operational constants obtained by calibration, the algorithm relating the thermophysical properties of the fluid with the mass flow rate and the current ($I_H$) applied to the second sensor with a current sufficient to cause self-heating.

6. The apparatus of claim 4, wherein the processor means determines the mass flow rate of the fluid using an algorithm that includes elements of the universal flow correlation and compensation factors for heat lost by conduction in the second sensor and temperature drop within the second sensor due to an internal thermal resistance, the algorithm based in part on the calibration information and relating the thermophysical properties of the fluid with the mass flow rate and the current ($I_H$) applied to the second sensor by the second current source to maintain the constant ratio between the second sensor resistance $R_H$ and the first sensor resistance $R_C$.

7. The apparatus of claim 6 wherein the algorithm is:

$$I_H^2 = \left(\frac{\gamma_q - 1}{\gamma_q}\right)\left(\frac{A_S * k}{R_{OH} * \alpha * d}\right) \left( \frac{C_1 + C_2\left(\frac{d}{\mu * A_p}\right)^n Pr^{1/3} m^n}{(1 + C_1 A_S R_T(k/d)) + (C_2 A_S R_T(k/d)(d/A_p\mu)^n Pr^{1/3} m^n)(1 - L_S)} \right)$$

where, m represents the mass flow rate of the fluid,
$A_P$ is a cross-sectional area of the fluid flow,
$\alpha$ represents a sensor temperature coefficient of resistance,
$A_S$ is the resistance temperature detector surface area, $R_T$ is an internal thermal resistance of the second sensor, $$\gamma_q = \frac{R_H}{R_C} \cdot \frac{R_{OC}}{R_{OH}},$$

$L_S$ is a fraction of the total power input ($I_H^2 R_H$) lost into the second sensor,
$R_{OC}$ represents a resistance of the first sensor at about 0° C., and
$R_{OH}$ represents an unheated resistance of the second sensor at about 0° C.

8. An apparatus for determining the mass flow rate of a fluid comprising:

a first sensor mounted in the fluid, the first sensor having a resistance which is a substantially linear function of a fluid temperature within an expected temperature range of the fluid, a second sensor mounted in the fluid at a location relative to the first sensor, the second sensor having a resistance which is a substantially linear function of the fluid temperature within an expected temperature range of the fluid, a first current source connected to the first sensor and applying a current ($I_C$) through and a voltage across the first sensor, producing a first sensor resistance $R_C$ and a first sensor voltage $V_C$, a second current source connected to the second sensor and applying a current ($I_H$) through and a voltage across the second sensor, producing a second sensor resistance $R_H$ and a second sensor voltage $V_H$, and a processor means for determining the mass flow rate of the fluid based on the amount of current ($I_H$) required to maintain a constant ratio between the second sensor resistance $R_H$ and the first sensor resistance $R_C$ and for producing a mass flow rate signal indicative of the mass flow rate of the fluid, wherein the first sensor is a resistance temperature detector having a resistance of:

$$R_C = R_{OC}(1 + \alpha T_A), \text{ and}$$

the second sensor is a resistance temperature detector having a resistance of:

$$R_H = R_{OH}(1 + \alpha T_A)\gamma_q$$

where, $R_{OC}$ represents a resistance of the first sensor at about 0° C.,
$R_{OH}$ represents an unheated resistance of the second sensor at about 0° C.,
$T_A$ represents an ambient temperature of the fluid,
$\alpha$ represents a sensor temperature coefficient of resistance, and $$\gamma_q = \frac{R_H}{R_C} \cdot \frac{R_{OC}}{R_{OH}}.$$

9. An apparatus for determining the mass flow rate of a fluid comprising:

a first sensor mounted in the fluid, the first sensor having a resistance which is a substantially linear function of a fluid temperature within an expected temperature range of the fluid, a second sensor mounted in the fluid at a location relative to the first sensor, the second sensor having a resistance which is a substantially linear function of the fluid temperature within an expected temperature range of the fluid, a first current source connected to the first sensor and applying a current ($I_C$) through and a voltage across the first sensor, producing a first sensor resistance $R_C$ and a first sensor voltage $V_C$, a second current source connected to the second sensor and applying a current ($I_H$) through and a voltage across the second sensor, producing a second sensor resistance $R_H$ and a second sensor voltage $V_H$, and a processor means for determining the mass flow rate of the fluid based on the amount of current ($I_H$) required to maintain a constant ratio between the second sensor resistance $R_H$ and the first sensor resistance $R_C$ and for producing a mass flow rate signal indicative of the mass flow rate of the fluid, wherein the processor means determines the first sensor resistance $R_C$ by dividing the first sensor voltage $V_C$ by the first fixed resistor signal, and the second sensor resistance $R_H$ by dividing the second sensor voltage $V_H$ by the signal, wherein the constant ratio is maintained by the processor means by adjusting the amount of current ($I_H$) provided to the second sensor by the second current source according to the determined first and second sensor resistances, and determines the mass flow rate of the fluid based on the amount of current ($I_H$) provided to the second sensor to maintain the constant ratio.

10. The apparatus of claim 1 further comprising a plurality of first sensors and a plurality of second sensors, having characteristics of the first and second sensor are located in the fluid, wherein a plurality of signals input into the plurality of first and second sensors are averaged by the controller to provide an averaged signal corresponding to an averaged mass flow rate of the fluid.

11. An apparatus for determining a mass flow rate of a fluid having temperatures ranging within an expected range comprising:

a first sensor mounted in the fluid, the first sensor having a resistance that is substantially a linear function of temperature within the expected temperature ranges of the fluid, a second sensor mounted in the fluid, the second sensor having a resistance that is substantially a linear function of temperature within the expected temperature ranges of the fluid, a first current source connected to the first sensor and applying a current ($I_C$) through and a voltage across the first sensor, producing a first resistance $R_C$ and a first sensor voltage $E_C$, a second current source connected to the second sensor and applying a current ($I_H$) through and a voltage across the second sensor, producing a second resistance $R_H$ and a second sensor voltage $E_H$, the first and second sensors producing sensor signals corresponding to $E_C$ and $E_H$, a control circuit for receiving the sensor signals and producing an output signal corresponding to the sensor signals, and a controller for receiving the output signal from the control circuit and providing control signals to the second and first current sources to maintain a constant current ratio between ($I_H$) and ($I_C$), the controller producing an output corresponding to the mass flow rate of the fluid according to the control signals provided to the second and first current sources that maintain the constant current ratio between ($I_H$) and ($I_C$).

12. An apparatus for determining a mass flow rate of a fluid having temperatures ranging within an expected range comprising:

a first sensor mounted in the fluid, the first sensor having a resistance that is substantially a linear function of temperature within the expected temperature ranges of the fluid, a second sensor mounted in the fluid at a location relative to the first sensor, the second sensor having a resistance that is substantially a linear function of temperature within the expected temperature ranges of the fluid, a first current source connected to the first sensor and applying a current ($I_C$) through and a voltage across the first sensor, producing a first resistance $R_C$ and a first sensor voltage $E_C$, a second current source connected to the second sensor and applying a current ($I_H$) through and a voltage across the second sensor, producing a second resistance $R_H$ and a second sensor voltage $E_H$, and a controller for producing an output corresponding to the mass flow rate of the fluid according to control signals provided to the second and first current sources that maintain a constant ratio between the second and first current sources, wherein the first sensor is a resistance temperature detector having a resistance of:

$R_C = R_{OC}(1 + \alpha T_A)$, and the second sensor is a resistance temperature detector having a resistance of:

$R_H = R_{OH}(1 + \alpha T_A)\gamma_q$ where, $R_{OC}$ represents the resistance of the first sensor at about 0° C., $R_{OH}$ represents the unheated resistance of the second sensor at about 0° C., $T_A$ represents the ambient temperature of the fluid, $\alpha$ represents the sensor temperature coefficient of resistance, and $$\gamma_q = \frac{R_H}{R_C} \cdot \frac{R_{OC}}{R_{OH}}.$$

13. The apparatus of claim 11 further comprising a microprocessor having memory which includes calibration information corresponding in part to and correlated with thermophysical properties of a fluid utilized in the determination of the mass flow rate of the fluid.

14. The apparatus of claim 13, wherein the microprocessor calculates the mass flow rate using an algorithm including elements of a universal flow correlation equation, including a number of operational constants obtained by calibration and including compensation factors for heat lost by conduction in the second sensor and temperature drop within the second sensor due to an internal thermal resistance, the algorithm relating the thermophysical properties of the fluid with the mass flow rate and the current ($I_H$) applied to the second sensor by the second current source.

15. The apparatus of claim 14 wherein the universal flow correlation equation is:

$$Nu = C_1 + C_2 Pr^{1/3} R_e^n$$

where,
Nu=hd/k is the Nusselt number,
h=heat transfer coefficient to the fluid,
d=probe diameter where the first and second sensors are mounted,
k=fluid thermal conductivity,
$C_1$ and $C_2$=constants determined by calibration,
Pr=Prandtl number for the fluid, $$R_e = (\rho V) d/\mu = \text{Reynolds number},$$

where,
$\rho V$=fluid mass velocity,
$\rho$=fluid density,
V=fluid velocity,
$\mu$=fluid viscosity, and
n=Reynolds number exponent determined by calibration.

16. The apparatus of claim 15 wherein the algorithm is:

$$I_H^2 = \left(\frac{\gamma_q - 1}{\gamma_q}\right)\left(\frac{A_S * k}{R_{OH} * \alpha * d}\right) \left( \frac{C_1 + C_2 \left(\frac{d}{\mu * A_p}\right)^n Pr^{1/3} m^n}{(1 + C_1 A_S R_T(k/d)) + (C_2 A_S R_T(k/d)(d/A_p \mu)^n Pr^{1/3} m^n)(1 - L_S)} \right)$$

where,
m represents the mass flow rate of the fluid,
$A_P$ is a cross-sectional area of the fluid flow,
$\alpha$ represents a sensor temperature coefficient of resistance,
$A_S$ is the resistance temperature detector surface area,
$R_T$ is an internal thermal resistance of the second sensor, $$\gamma_q = \frac{R_H}{R_C} \cdot \frac{R_{OC}}{R_{OH}},$$

$C_1$ and $C_2$, constants determined by regression during calibration, n is an exponent determined by regression during calibration,
k=fluid thermal conductivity,
d=probe diameter where the first and second sensors are mounted,
$\mu$=fluid viscosity, and
Pr=Prandtl number for the fluid,
$L_S$ is a fraction of the total power input ($I_H^2 R_H$) lost into the second sensor,
$R_{OC}$ represents a resistance of the first sensor at about 0° C., and
$R_{OH}$ represents an unheated resistance of the second sensor at about 0° C.

17. The apparatus of claim 13, wherein the microprocessor further includes a measurement module utilizing the calibration information to determine the mass flow rate of the fluid, including the thermophysical properties, based on measurements obtained during the utilization of the apparatus within a fluid according to a measurement mode of operation.

18. The apparatus of claim 11 further comprising a plurality of first sensors and a plurality of second sensors, having characteristics of the first and second sensor are located in the fluid, wherein a plurality of signals input into the plurality of first and second sensors are averaged by the controller to provide an averaged signal corresponding to an averaged mass flow rate of the fluid.

19. An apparatus for determining the mass flow rate of a fluid comprising:
a first sensor mounted in the fluid,
a second sensor mounted in the fluid,
a first current source connected to the first sensor and applying a fixed current ($I_C$) through and a voltage across the first sensor, producing a first sensor resistance $R_C$ and a first sensor voltage $V_C$,
a second current source connected to the second sensor and applying a current ($I_H$) through and a voltage across the second sensor, producing a second sensor resistance $R_H$ and a second sensor voltage $V_H$,
a first fixed resistor for producing a first signal corresponding to an amount of current ($I_C$) through the first sensor,
a second fixed resistor for producing a second signal corresponding to an amount of current ($I_H$) through the second sensor,
the first and second sensors producing sensor signals corresponding to $V_C$ and $V_H$, and
a microprocessor for receiving and processing the first, second, and sensor signals, for controlling ($I_H V_H$) to maintain a constant temperature difference between the second and first sensors based on the processed first, second, and sensor signals, and for determining the mass flow rate of the fluid based on ($I_H V_H$) applied to the second sensor required to maintain the constant temperature difference between the second and first sensors, wherein the microprocessor utilizes calibration information, a universal flow equation, thermophysical properties of the fluid, and probe stem loss information to produce a mass flow rate signal indicative of the mass flow rate of the fluid.

20. The apparatus of claim 19, wherein the microprocessor determines the mass flow rate of the fluid using an algorithm that includes elements of the universal flow correlation and compensation factors for heat lost by conduction in the second sensor and temperature drop within the second sensor due to an internal thermal resistance, the algorithm based in part on the calibration information and relating the thermophysical properties of the fluid with the mass flow rate and the current ($I_H$) applied to the second sensor by the second current source.

21. The apparatus of claim 20, wherein the algorithm is:

$$V_H I_H = \left(\frac{A_S k}{d}\right) \left( \frac{C_1 + C_2 \left(\frac{d}{\mu * A_p}\right)^n Pr^{1/3} m^n}{(1 + (C_1 A_S R_T(k/d))) + (C_2 A_S R_T(k/d)(d/A_p \mu)^n Pr^{1/3} m^n)(1 - L_S)} \right)$$

where,
m represents the mass flow rate of the fluid,
$A_P$ is a cross-sectional area of the fluid flow, $A_S$ is the resistance temperature detector surface area, $R_T$ is an internal thermal resistance of the second sensor, $C_1$ and $C_2$, constants determined by regression during calibration, n is an exponent determined by regression during calibration, k=fluid thermal conductivity, d=probe diameter where the first and second sensors are mounted, $\mu$=fluid viscosity, and Pr=Prandtl number for the fluid, $L_S$ is a fraction of the total power input ($I_H^2 R_H$) lost into the second sensor.

22. An apparatus for determining the mass flow rate of a fluid having a temperature, known fluid thermophysical properties, and calibration information comprising:

a sensing means having a resistance which is a function of temperature, a current source connected to the sensing means for applying a current through and a voltage across the sensing means, a fixed resistor in series with the sensing means and the current source, for outputting a first signal indicative of the resistance of the sensing means, a reference sensor operable to provide a second signal indicative of the fluid temperature, and a processor means for receiving and processing the first, second, and sensor signals, for controlling the current source and determining the mass flow rate of the fluid utilizing the fluid thermophysical properties and calibration information with a universal flow correlation equation, the controlled current source for maintaining a constant temperature difference between the sensing means and the fluid temperature during calibration and the same temperature difference during operation of the apparatus to determine the mass flow rate of the fluid, the processor means for outputting a signal indicative of the mass flow rate of the fluid based on the calibration information and current provided by the current source to maintain the constant temperature difference.

23. An apparatus for determining the mass flow rate of a fluid comprising:

a first sensor mounted in the fluid for producing a first sensing signal, the first sensor having a resistance which is a function of a fluid temperature within an expected temperature range of the fluid, a second sensor mounted in the fluid for producing a second sensing signal, the second sensor having a resistance which is a function of the fluid temperature within an expected temperature range of the fluid, a first current source connected to the first sensor and applying a current ($I_C$) through and a voltage across the first sensor, producing a first sensor resistance $R_C$ and a first sensor voltage $V_C$, a second current source connected to the second sensor and applying a current ($I_H$) through and a voltage across the second sensor, producing a second sensor resistance $R_H$ and a second sensor voltage $V_H$, and processor means for determining the mass flow rate of the fluid based on the current ($I_H$) required to maintain a constant ratio between the first sensing signal and the second sensing signal, or ($I_H V_H$) required to maintain a constant difference between the first sensing signal and the second sensing signal, wherein the processor means contains calibration information from a calibration in a first fluid having first thermophysical properties and first stem loss characteristics and utilizes the calibration information to determine the mass flow rate of a second fluid having second thermophysical properties and second stem loss characteristics, the processor means outputting a mass flow rate signal representative of the mass flow rate of the second fluid.

24. The apparatus of claim 22, wherein the universal flow correlation equation is:

$$Nu = C_1 + C_2 Pr^{1/3} R_e^n$$

where,

Nu=hd/k is the Nusselt number, h=heat transfer coefficient to the fluid, d=probe diameter where the first and second sensors are mounted, k=fluid thermal conductivity, $C_1$ and $C_2$=constants determined by calibration, Pr=Prandtl number for the fluid, $$R_e = (\rho V) d / \mu = \text{Reynolds number},$$

where, $\rho V$=fluid mass velocity, $\rho$=fluid density,

V=fluid velocity, $\mu$=fluid viscosity, and n=Reynolds number exponent determined by calibration.

* * * * *